Patented Sept. 20, 1938

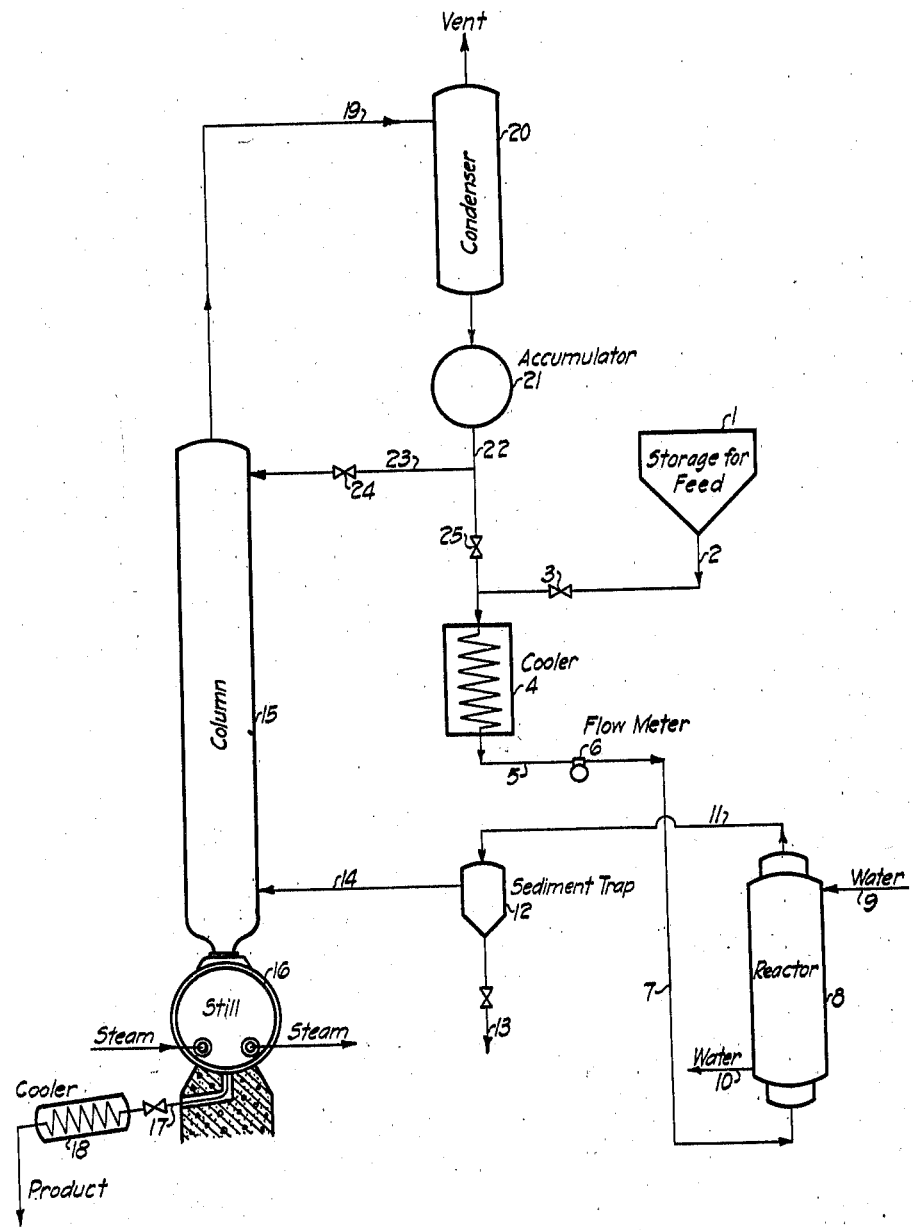

2,130,592

UNITED STATES PATENT OFFICE 2,130,592

ALDOL CONDENSATION PROCESS

Sumner H. McAllister, Lafayette, and Edwin F. Bullard, Oakland, Calif., assignors to Shell Development Company, San Francisco, Calif., a corporation of Delaware Application June 12, 1937, Serial No. 147,944

16 Claims. (Cl. 260—594)

This invention deals with an improved procedure for carrying out aldol condensation reactions, that is, reactions between like or unlike carbonylic compounds in which a carbonyl carbon of one reactant becomes converted to a hydroxylated carbon directly attached to a carbon atom of the other reactant, with or without the subsequent splitting off of the hydroxyl group as water. It provides a commercially available method for effecting such reactions more efficiently and economically than has been heretofore possible.

Another object of our invention is the provision of an improved basic catalyst for use in such condensations, which is not only of longer life than those suggested by the prior art but also is free of the operating difficulties which prior art catalysts introduce and is capable of regeneration after loss of activity in a very simple manner.

When aldol condensations are conducted on a small scale it is feasible to effect the reaction by trickling the carbonylic compound or compounds to be reacted down thru a tower containing lime or stick caustic or the like. In practical industrial scale operations, however, such methods are very unsuitable as they give low conversions, many operating difficulties and high catalyst consumption. Aldol condensation reactions require low temperatures for high conversions but high temperatures for high reaction rates. These conflicting requirements cannot be met by prior methods of operation as these provide no practical method for dissipating the heat produced in the exothermic reaction involved which is rendered particularly difficult by the fact that the catalysts used are poor conductors of heat. We have discovered that these difficulties may be overcome and many important operating advantages simultaneously achieved by feeding the carbonylic reactants upward thru a column packed with a basic agent, most preferably a substantially insoluble base in a granular, active form, for example, calcium or barium hydroxide, or the like, made granular, in accordance with our invention, by the use of suitable binders. By this method of operation, the catalyst may be uniformly flooded with the reactants and the excess heat of reaction absorbed thereby and uniformly and continuously removed thus eliminating overheating, particularly the localized overheating at the catalyst surface which occurs when the material to be condensed is trickled down over the catalyst and which results in low conversions, even when external cooling is applied, because of the failure to control the temperature where the reaction is taking place. Our procedure not only thus combines high reaction rates with high conversions but also gives high production from a given amount of catalyst both on a total and on a per pass basis, as it eliminates channeling such as is encountered when the reactants are fed to the top of a catalyst tower, in addition to providing long catalyst life. It also avoids the difficulties of plugging due to accumulation of fines on the catalyst supporting screen and/or in the lower part of the catalyst bed that are characteristic of prior methods.

Our process may be used for the aldol condensation of an aldehyde with itself or with another aldehyde or with a ketone or of a ketone alone or with another ketone or for other analogous condensations. Typical condensations which may be carried out by the process of our invention with great advantage are described, for example, in United States Patents 1,030,177; 1,714,378; 1,864,908 and 1,926,567. The carbonylic compounds used may be either aliphatic or cyclic, including, for example, alicyclic, aromatic and heterocyclic aldehydes and ketones. These may be either saturated or unsaturated compounds with or without substituent elements or groups which may be inert under the reaction conditions or which may undergo simultaneous change without interfering with the production of the desired condensation product. The process may be conducted for the substantial production of simple products corresponding to the union of only two molecules of the reacting compounds or for the production of higher condensation products. Thus, for example, formaldehyde may be condensed with acetaldehyde by the process of our invention to give substantially only beta hydroxypropionaldehyde as the intermolecular condensation product or by the use of higher proportions of formaldehyde di- and/or tri-hydroxymethyl acetaldehyde or pentaerythritol may be made the major reaction product. Furthermore by suitable manipulation of operating conditions the primary product, usually an aldol or a ketol, may be made the ultimate product, or the corresponding unsaturated compound resulting from elimination of an hydroxyl group or of hydroxyl groups from the primary product may be recovered. Other variations within the scope of our invention will be apparent to those skilled in the art.

For the purpose of making our invention more clear it will be described with more particular reference to the condensation of ketones as exemplified by the manufacture of diacetone alcohol from acetone using the preferred arrangement of apparatus diagrammatically represented in the accompanying drawing. It will be understood, however, that this implies no limitation on our invention as our process and catalyst are equally applicable to other aldol condensations and may be successfully used with other apparatus embodying the same principles.

In our preferred method of manufacturing diacetone alcohol illustrated in the drawing, acetone, which is most preferably anhydrous as purification of the final product is simpler when water is not present in substantial amounts but which may contain considerable water without interfering with the process of our invention, is fed from storage tank 1 by a pipe line 2 at a rate controlled by the adjustment of valve 3 to a cooler 4 which may be cooled by water or other suitable agents in any suitable manner not shown. The cooled acetone is withdrawn thru line 5 and passed via flowmeter 6, which serves as an aid in maintaining uniform operation, and line 7 to the bottom of reactor 8. Reactor 8 is a water jacketed tower packed with a solid condensation catalyst of any suitable kind but most preferably with a porous granular basic condensation catalyst the preparation of which will be more fully described hereinafter. Cooling water or other suitable cooling agent is circulated around and/or thru the catalyst column, countercurrent to the direction of acetone flow by means of lines 9 and 10. The rising stream of acetone entering at the bottom of the catalyst completely fills the catalyst tower and not only provides uniform reaction conditions thruout the catalyst bed particularly by rapidly removing the heat of reaction at the catalyst surface but also provides improved heat transfer from the catalyst to the external cooling medium. The contact of the acetone with the catalyst causes condensation to diacetone alcohol until the equilibrium is reached, e. g., 11.73% by weight at 25° C. The reaction mixture is withdrawn from the top of the catalyst by pipe line 11 and conducted via sediment trap 12, provided with a valve controlled draw-off line 13 for removal of suspended matter such as catalyst particles, etc., which settle out therein, and thence by pipe line 14 to fractionating column 15 in which the unreacted acetone is separated from the condensation products. The latter, substantially diacetone alcohol with only very small amounts of higher condensation products, in contact times of about 2 to about 10 minutes are used with our preferred catalysts, are recovered as bottoms from steam heated still 16 from which they are withdrawn by valve controlled line 17 thru cooler 18. Unreacted acetone is taken off as top product of distillation column 15, via line 19 leading to a suitably vented condenser 20 which feeds condensate to accumulator 21. The condensate collected in accumulator 21 is withdrawn by line 22, a part returned to the column as reflux by means of pipe 23 and the remainder sent in admixture with fresh acetone to cooler 4. The reflux ratio in column 15 may be regulated by adjustment of valves 24 and 25.

The improved results obtainable by this method of operation as compared with trickling the acetone down over the catalyst are shown by the following results obtained in the condensation of acetone using in all cases our improved catalyst comprising calcium oxide in a porous, granular form produced by means of a cement catalyst binder.

| Method of feeding | Reactor jacket temp. | Feed rate cc./min. | Temperature feed product | | Diacetone alcohol in reaction product | Percent of equilibrium attained | Mols. of diacetone alco/1000 cc. catalyst/hr. |
|---|---|---|---|---|---|---|---|
| | | | In | Out | | | |
| | °C. | | °C. | °C. | Percent | | |
| Trickled from top | 0–5 | 13.3 | 21.6 | 10.0 | 10.7 | 56.0 | 1.5 |
| Flooded from bottom | 0–5 | 17.0 | 21.2 | 11.0 | 13.2 | 72.2 | 2.4 |
| Trickled from top | 20–21 | 32.0 | 22.2 | 22.8 | 9.7 | 77.5 | 3.4 |
| Flooded from bottom | 20–21 | 32.0 | 23.5 | 23.0 | 11.4 | 92.5 | 3.95 |
| Trickled from top | 20–21 | 58.0 | 24.4 | 22.7 | 10.9 | 80.0 | 6.3 |
| Flooded from bottom | 20–21 | 64.0 | 24.6 | 23.8 | 10.4 | 88.0 | 7.2 |

These results were obtained using a column only 3.1 cm. in diameter packed with 380 cc. of catalysts. Even greater improvements may be obtained when larger diameter reactors are used as the difficulty of adequately controlling the temperature unless the flooding procedure of our invention is used, is much greater in such cases. Our procedure has the further advantage that it permits the use of small amounts and/or relatively high temperature cooling water.

Similar improvements can be obtained by the use of our procedure with solid catalysts such as lime, caustic, barium hydroxide, soda lime, and the like in which no binder is used. Such catalysts are less advantageous than those in which a suitable binder is used in accordance with our invention. Sodium hydroxide and soda lime, for example, are not only appreciably soluble in most aldehydes and ketones but also are deliquescent so that their losses are high particularly when even traces of moisture are present in the reactants. The life of these catalysts is thus not only short but also substantial quantities of acid must be used and careful and expensive supervision exercised in neutralizing the reacted mixture in order to prevent sufficient quantities of base or excess acid from entering the distillation column where a non-neutral condition causes reversal of the equilibrium and regeneration of starting material and/or resinification. The usual powdered insoluble hydroxides suffer from other disadvantages. Due to their finely divided form they clog filters or are passed thru so that neutralization is again required. Furthermore calcium and/or barium hydroxides when used alone form slimes on their surface which are impervious to aldehydes and ketones and which rapidly reduce the activity of the catalyst as well as cause the formation of channels thru the catalyst bed. Also their finely divided form makes regeneration extremely difficult. These objections to the powdered insoluble hydroxides may be partially overcome by pressing them into pellets, but in so doing, the surface area is greatly reduced so that their activity is materially reduced. Aldol condensations with insoluble catalysts are surface reactions in which the reaction rate depends upon the amount of available catalyst present. Pellets give low rates. Furthermore in use, the pellets break down into the powdered form readily. They are further very hard to handle and subject to high losses thru breakage, in charging, etc.

We have found that a greatly improved form of aldol condensation catalyst, which is granular and strong yet porous and very active, may be prepared by using as a binder for powdered insoluble hydroxides, a basic material such as sodium silicate, borax, Portland cement, or the like. One typical method of producing such a catalyst comprises mixing hydrated lime (45 parts by weight), Portland cement (14 parts), kieselguhr (6 parts), sodium hydroxide (1 part) and water (approximately 33 parts) into a smooth paste and then spreading in slabs on wire bottom trays or the like and carefully drying to preferably about 8 to 12% moisture. All that is then necessary is to grind and screen to preferably about 8 to 20 mesh in order to have a very suitable condensation catalyst. The proportions of the ingredients may be varied widely, those given appear however, to give particularly good results. Too large amounts of sodium hydroxide are preferably avoided as they tend to give reaction products of high alkalinity which require excessive neutralization and catalysts of, or very low in, sodium hydroxide are preferred. Too high proportions of cement are also preferably not used as they cause reduced catalytic activity. The kieselguhr may be entirely omitted altho it appears to add a desirable degree of porosity without sacrifice of either mechanical or catalytic strength when used in moderate proportions. Another suitable method of preparing the bonded condensation catalysts of our invention comprises admixing dry calcium hydroxide with a commercial solution of water glass, about 3 parts of silicate solution to 2 parts of calcium hydroxide are suitable but higher proportions of hydroxide may also be used. The constituents are preferably worked together gradually until a thick, almost dry, paste results which may then be dried for a few hours at about 100–110° C. or higher whereby a granular, insoluble product is obtained. This may be ground, screened and sized without loss of its desirable granular character.

Bonded catalysts of this type present a large amount of surface and are porous in nature. They are mechanically strong and rugged and are very effective aldol condensation agents. They are particularly suitable for the packing of towers or similar reactors and when so used do not break down or change in size to any significant extent. They do not form impervious slime films, which clog the catalyst tower. As a result it is possible to pass aldehydes and/or ketones thru masses of these catalysts, feeding either from the top or more preferably from the bottom, without encountering channeling and the product may be drawn off from such a catalyst free from the base by the use of a supporting screen only slightly finer than those used to grade the catalyst. With freshly prepared catalyst, there is a tendency for a small amount of base to escape with the product and it is considered advisable to add a small quantity of tartaric acid or the like to the kettle as a precautionary measure to eliminate any possibility of reversal of equilibrium. Catalysts of this form, therefore, offer material advantages over the other forms now in use in reactions involving contacting insoluble bases with liquids generally and in carrying out aldol condensations in particular.

While any suitable basic agent may be treated with a binder in accordance with our invention and successfully used, we preferably employ bases having a low solubility in the material to be condensed and most preferably also a low solubility in water. Our preferred group of bases are the hydroxides, oxides and basic salts such as the carbonates, oxychlorides, etc., for example, of the elements of group two of the periodic table, but similar cupric, cuprous, lead, aluminum, manganese, iron, tin and other suitable compounds may be used. Instead of basic catalysts it may sometimes be advantageous to employ suitable acid condensation agents such, for example, as phosphoric, telluric, stannic, tungstic or like acids or acid salts such as sodium bisulfate and the like, again using appropriate binders in order to increase the life and effectiveness thereof. These acid catalysts are particularly useful where dehydration of the condensation product is desired as in the manufacture of unsaturated aldehydes and/or ketones, from lower saturated or unsaturated aldehydes and/or ketones. In such cases, acid catalysts prepared with suitable binders may be used alone or together with basic catalysts, preferably also as in granular form with binders as hereinbefore described. The acid catalyst granules may be packed in the same tower with the basic condensation catalyst when the two are used together, and preferably are placed as a separate layer at the effluent end of the tower in such a case, or separate towers may be used for the two catalysts.

As binding agent for the preparation of the improved granular catalysts of our invention, any binder which is substantially insoluble in the reaction mixture under the reaction conditions and which has sufficient strength to support the catalyst mass under the conditions of use, may be applied. Typical of the diverse materials which are suitable are, for example, inorganic binders such as potassium silicate, borax, sodium carbonate, dehydrated hydrosols of metal oxides, such as silica gel and the like, low melting and/or plastic metals such as lead, copper, etc., as well as the Portland cement and water glass binders already mentioned, and organic binders including glue, suitable synthetic resins, particularly the infusible types of phenol- and/or urea- or thiourea-formaldehyde resins such as Bakelite and the like, insoluble vinyl chloride resins and alkyd resins, etc. The choice of binder will determine the best method of preparing the desired catalyst. The catalysts may contain one or more condensation agents and more than one binder as well as other constituents which may be advantageous in increasing the porosity or other desirable characteristics of the catalysts. For example, the inclusion of small amounts of metals or alloys, preferably in powdered form is useful in increasing the heat conductivity of the catalyst and assists in maintaining uniform reaction conditions throughout the catalyst mass.

Our granular condensation catalysts offer particular advantage in their ease of reactivation. We have found that catalysts used in effecting aldol condensations tend to gradually lose their activity apparently due either to the formatiton of impermeable coatings, possibly resins resulting from polymerization of small amounts of higher condensation products, or to dehydration of the catalyst surface, or to both. Whatever may be the cause, we find that the activity of the catalyst may be substantially restored after it has fallen off in use, by steaming and/or water washing, preferably washing with hot water. This procedure may be applied to the revivification of any water insoluble aldol condensation catalyst regardless of its form, but it is especially effective in connection with the improved granular catalysts prepared with binders in accordance with our invention, because in such cases an entirely new active catalyst surface appears to be formed. Thus in one typical example, where a granular calcium hydroxide catalyst with a Portland cement binder was used for the condensation of acetone to diacetone alcohol, the initial product contained an average of about 11.5% diacetone alcohol representing about 96% of the theoretical equilibrium value. After 659 hours of operation during which 1730 pounds of diacetone alcohol were produced or 295 pounds per pound of catalyst, the conversion fell to 6.2% or approximately 52% of the equilibrium value. Portions of this catalyst were reactivated in various ways and tested with the following results:

| Treatment | Percent diacetone alcohol in the product |
| --- | --- |
| Nitrogen passed over catalyst at 200–250° C. for 20 minutes | 7.3 |
| Steamed at 120–175° C. for 110 minutes | 8.4 |
| Soaked in water and dried in nitrogen at 45° C | 10.5 |
| Soaked in water and dried with alcohol and ether | 10.7 |
| Washed with water by percolation, rinsed with acetone | 11.4 |

Such reactivations may be repeated many times so that the ultimate catalyst cost is very small indeed.

It will be apparent that the process of our invention and the novel catalysts used therein offer many advantages, particularly in efficiency and economy of operation, over prior condensation methods. It is not only capable of wide variation with respect to the type of compounds which may be reacted and of products which may be obtained, but also the operating arrangement may be greatly modified. Thus, for example, where the process is being operated to produce unsaturated ketones or aldehydes directly, a dehydrator, which may be another still or which may be a chemical water remover as an anhydrous sodium sulfate, or similar treater, may be put into the system, preferably in pipe line 22 between valve 25 and line 3. Where higher condensation products are being manufactured as in the production, for example, of triacetone alcohol from acetone, a part of the reaction product may be recirculated advantageously by joining lines 7 and 11 with a valve controlled by-pass. Also in place of the single catalyst tube shown in the drawing, a bundle of such tubes enclosed in a single water jacket may be advantageously used in large scale operations. Still other changes may be made without departing from the spirit of our invention which is not to be regarded as limited to the details of operation disclosed, nor by the soundness of the theories advanced in explanation of the improved results attained, but only by the terms of the accompanying claims in which it is our intention to claim all novelty inherent therein as broadly as is possible in view of the prior art.

By the expression "ketaldone" as used in the following claims, it is meant to designate generically ketones and aldehydes in conformity with the usage adopted in United States Patent 2,085,776.

We claim as our invention:

1. In a process of producing a condensation product of a ketaldone, the steps of contacting the carbonylic compound to be condensed with a solid condensation catalyst capable of promoting said condensation at a point below the top of said catalyst and withdrawing reacted mixture at a higher point.

2. In a process of producing a condensation product of a carbonylic compound of the class consisting of aldehydes and ketones, the steps of feeding a condensable carbonylic compound of said class in the liquid state into the bottom of a tower containing a solid condensation catalyst capable of promoting said condensation and withdrawing a condensation product of said compound from the top thereof.

3. In a process of producing a condensation product of a carbonylic compound of the class consisting of aldehydes and ketones the step of feeding a substantially unbroken stream of a liquid containing a condensable aliphatic carbonylic compound of said class, thru a solid condensation catalyst capable of promoting said condensation, in heat transfer relationship with a cooling agent.

4. In a process of producing a condensation product in accordance with claim 3, the step of flowing the stream of aliphatic carbonylic compound containing liquid countercurrent to a stream of liquid cooling agent.

5. In a process of producing a condensation product of a ketone the steps of contacting a ketone containing liquid with a solid condensation catalyst capable of promoting said condensation at a point below the top thereof and withdrawing reacted mixture at a higher point.

6. In a process of producing a ketol, the steps of contacting a ketone with a solid condensation catalyst capable of promoting the condensation of said ketone and to said ketol at a point below the top thereof and withdrawing reacted mixture at a higher point.

7. In a process of producing diacetone alcohol, the steps of contacting acetone with a solid basic condensation catalyst capable of promoting the condensation of said ketone and to said ketol at a point below the top thereof and withdrawing reacted mixture at a higher point.

8. In a process of producing a condensation product of a carbonylic compound of the class consisting of aldehydes and ketones, the step of contacting a condensable carbonylic compound of said class with a granular condensation catalyst comprising particles of a solid condensation catalyst capable of promoting said condensation bound together by a binder which is substantially insoluble in said carbonylic compound under the reaction conditions.

9. In a process of producing a condensation product of a carbonylic compound of the class consisting of aldehydes and ketones, the step of contacting a condensable carbonylic compound of said class with a granular condensation catalyst comprising a basic compound capable of promoting said condensation and a binder for the particles thereof which is substantially insoluble in said carbonylic compound under the reaction conditions.

10. In a process of producing a condensation product of a carbonylic compound of the class consisting of aldehydes and ketones, the step of contacting a condensable carbonylic compound of said class with a granular condensation catalyst comprising a basic compound capable of promoting said condensation and a basic binder for the particles thereof which is substantially insoluble in said carbonylic compound under the reaction conditions.

11. In a process of producing a condensation product of a carbonylic compound of the class consisting of aldehydes and ketones, the step of contacting a condensable carbonylic compound of said class with a granular condensation catalyst comprising a substantially water insoluble basic compound capable of promoting said condensation and Portland cement as a binder therefor.

12. In a process of producing a condensation product of a carbonylic compound of the class consisting of aldehydes and ketones, the step of contacting a condensable carbonylic compound of said class with a granular condensation catalyst comprising a basic hydroxide of a metal of group two of the periodic table and Portland cement as a binder therefor.

13. In a process of producing a condensation product of a carbonylic compound of the class consisting of aldehydes and ketones by contacting a carbonylic compound of said class with a substantially water insoluble condensation catalyst capable of promoting said condensation, the step of increasing the activity of said catalyst after the activity has been reduced by use, comprising contacting the used catalyst with water and subsequently removing the surplus water.

14. In a process of producing a condensation product of a carbonylic compound of the class consisting of aldehydes and ketones by contacting a carbonylic compound of said class with a substantially water insoluble basic condensation catalyst capable of promoting said condensation, the step of increasing the activity of said catalyst after the activity has been reduced by use, comprising contacting the used catalyst with warm water and subsequently removing the surplus water at a temperature below 100° C.

15. In a process of producing a condensation product of a carbonylic compound of the class consisting of aldehydes and ketones by contacting a carbonylic compound of said class with a basic hydroxide of a metal of group two of the periodic table held in granular form by means of Portland cement, the step of increasing the activity of said catalyst after the activity has been reduced by use, comprising contacting the used catalyst with water and subsequently removing the surplus water.

16. A process of producing a ketol which comprises continuously feeding an aliphatic ketone in the liquid state to the bottom of a water jacketed tower containing a basic hydroxide of a metal of group two of the periodic table held in granular form by Portland cement, continuously withdrawing reacted mixture from the top of said tower and distilling off therefrom unreacted ketone and returning said distillate, together with fresh ketone equivalent to that reacted, to the bottom of said tower.

SUMNER H. McALLISTER.
EDWIN F. BULLARD.